US009141318B2

(12) United States Patent
Morita et al.

(10) Patent No.: US 9,141,318 B2
(45) Date of Patent: Sep. 22, 2015

(54) INFORMATION PROCESSING SYSTEM, INFORMATION PROCESSOR, NON-TRANSITORY COMPUTER READABLE MEDIUM, AND INFORMATION PROCESSING METHOD FOR ESTABLISHING A CONNECTION BETWEEN A TERMINAL AND AN IMAGE PROCESSOR

(71) Applicant: FUJI XEROX CO., LTD., Minato-ku, Tokyo (JP)

(72) Inventors: Masao Morita, Kanagawa (JP); Tadao Michimura, Kanagawa (JP)

(73) Assignee: FUJI XEROX CO., LTD, Tokyo (JP)

( * ) Notice: Subject to any disclaimer, the term of this patent is extended or adjusted under 35 U.S.C. 154(b) by 0 days.

(21) Appl. No.: 14/228,908

(22) Filed: Mar. 28, 2014

(65) Prior Publication Data
US 2015/0029542 A1 Jan. 29, 2015

(30) Foreign Application Priority Data

Jul. 25, 2013 (JP) ................................ 2013-154376

(51) Int. Cl.
G06F 15/00 (2006.01)
G06K 1/00 (2006.01)
G06F 3/12 (2006.01)
H04N 1/00 (2006.01)

(52) U.S. Cl.
CPC ............ *G06F 3/1236* (2013.01); *G06F 3/1286* (2013.01); *G06F 3/1293* (2013.01); *H04N 1/001* (2013.01)

(58) Field of Classification Search
None
See application file for complete search history.

(56) References Cited

U.S. PATENT DOCUMENTS

| 2007/0091361 | A1* | 4/2007 | Matsugashita | ............... 358/1.15 |
| 2007/0288623 | A1 | 12/2007 | Kato et al. | |
| 2009/0219569 | A1* | 9/2009 | Hara | ............................. 358/1.15 |
| 2010/0064293 | A1* | 3/2010 | Kang et al. | .................... 718/104 |
| 2010/0177340 | A1* | 7/2010 | Huster et al. | ................. 358/1.15 |
| 2010/0208298 | A1* | 8/2010 | Kitagata | ....................... 358/1.15 |
| 2011/0131576 | A1* | 6/2011 | Ikegaya et al. | ..................... 718/1 |
| 2011/0289204 | A1* | 11/2011 | Hansson et al. | ............. 709/224 |
| 2012/0044538 | A1* | 2/2012 | Lin et al. | ....................... 358/1.15 |
| 2013/0061086 | A1* | 3/2013 | Baba | ................................. 714/3 |
| 2013/0067019 | A1* | 3/2013 | Srinivas et al. | ............... 709/213 |
| 2013/0321861 | A1* | 12/2013 | Ishihara et al. | .............. 358/1.15 |

FOREIGN PATENT DOCUMENTS

| JP | 2008-004110 A | 1/2008 |
| JP | 4127315 B2 | 7/2008 |
| JP | 4720959 B2 | 7/2011 |

* cited by examiner

*Primary Examiner* — Ming Hon
(74) *Attorney, Agent, or Firm* — Sughrue Mion, PLLC

(57) ABSTRACT

An information processing system has a terminal apparatus, an information processor, and an image processor connected to one another. The information processor includes first and second virtual machines, a first receiving unit receiving a connection request from the image processor, a first forwarding unit forwarding the connection request to the first machine, a second receiving unit receiving another connection request from the terminal apparatus, and a second forwarding unit forwarding the another connection request to the second machine. The first machine includes an acquiring unit receiving from the image processor job information according to a job set by a user and acquiring second machine information based on the job information, a job transfer requesting unit requesting the second machine to transfer the job based on the second machine information, and a connecting unit receiving the job from the second machine and connecting the first machine and the image processor.

13 Claims, 6 Drawing Sheets

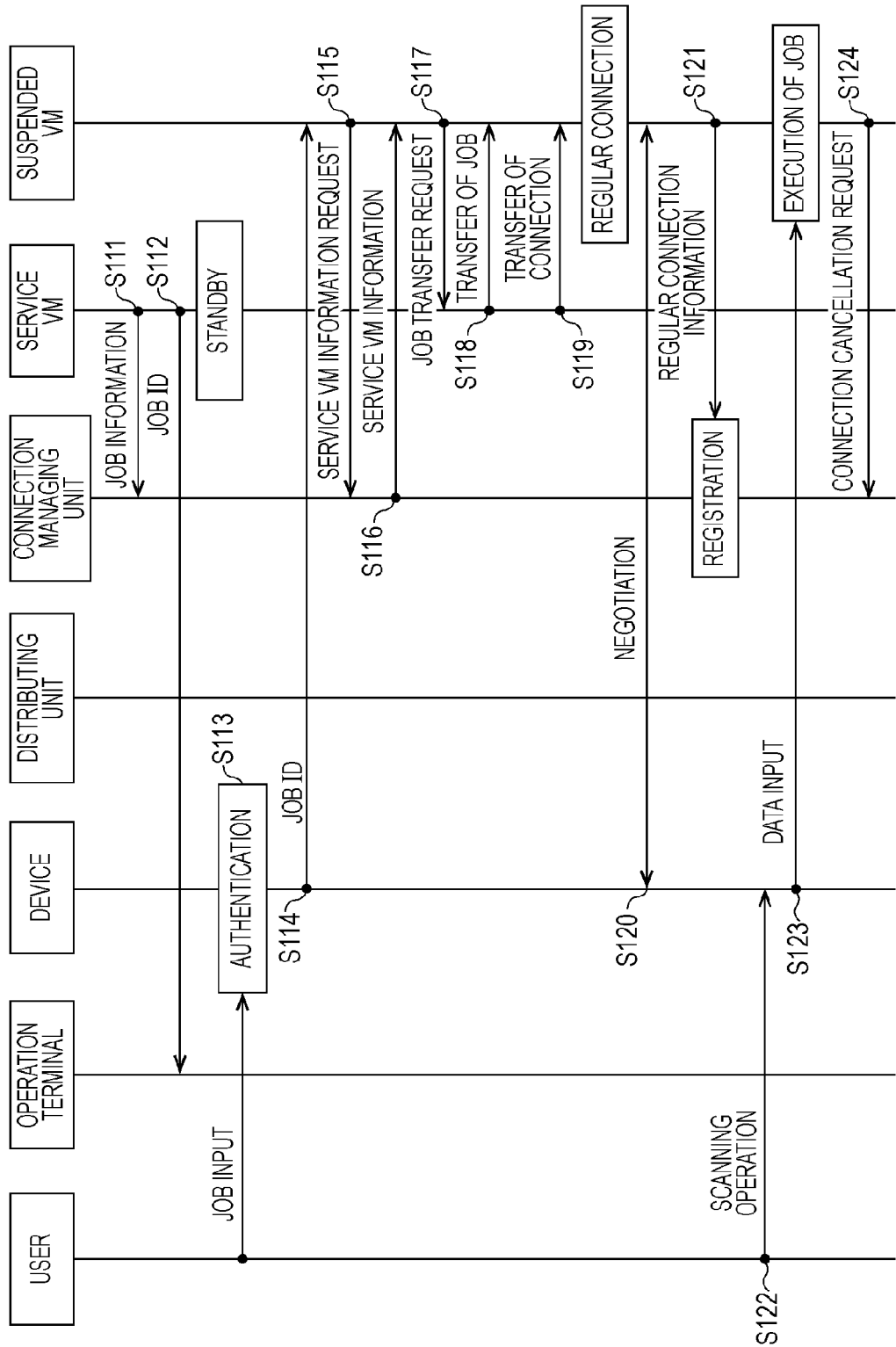

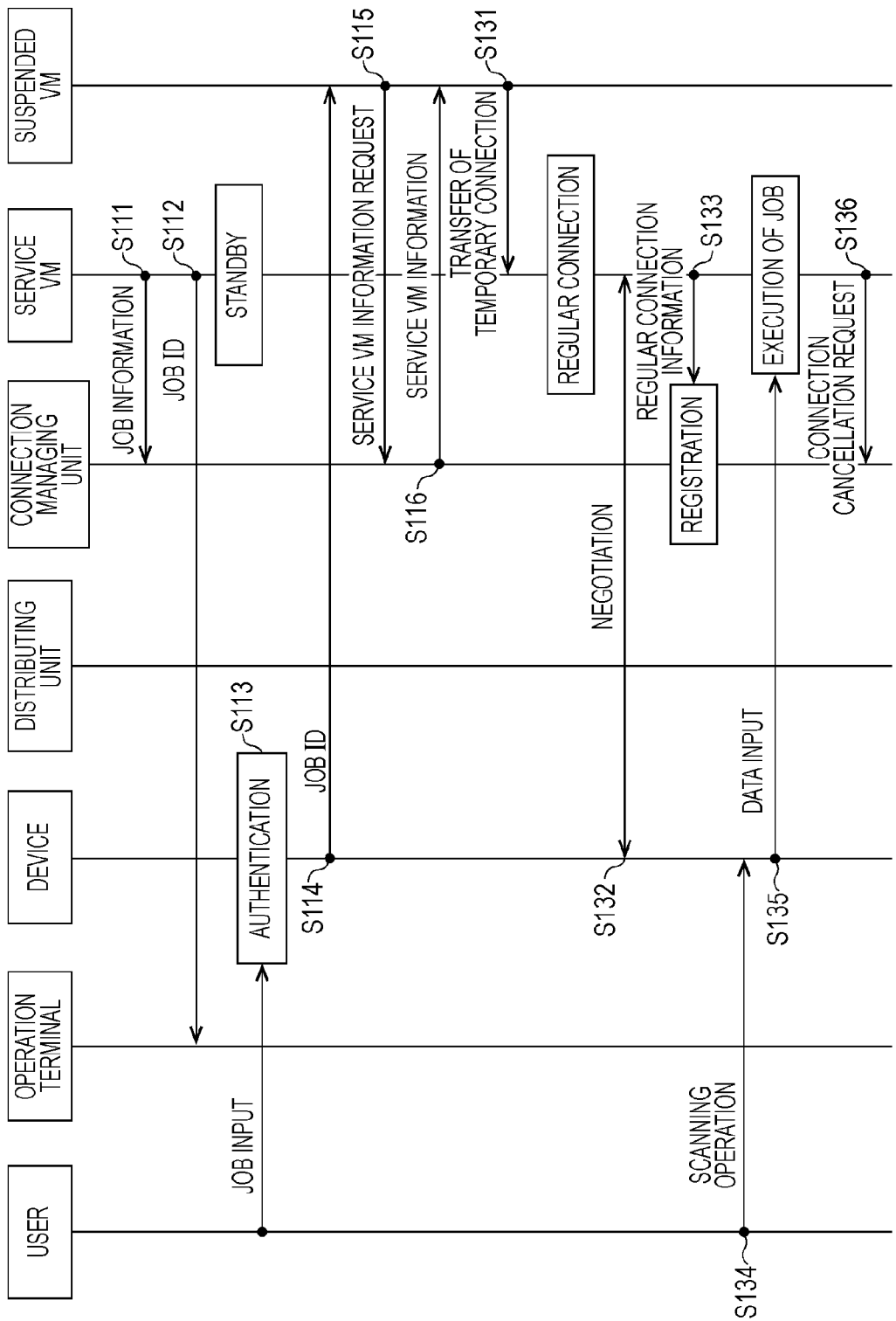

INFORMATION PROCESSING SYSTEM, INFORMATION PROCESSOR, NON-TRANSITORY COMPUTER READABLE MEDIUM, AND INFORMATION PROCESSING METHOD FOR ESTABLISHING A CONNECTION BETWEEN A TERMINAL AND AN IMAGE PROCESSOR

CROSS-REFERENCE TO RELATED APPLICATIONS

This application is based on and claims priority under 35 USC 119 from Japanese Patent Application No. 2013-154376 filed Jul. 25, 2013.

BACKGROUND (i) Technical Field

The present invention relates to an information processing system, an information processor, a non-transitory computer readable medium, and an information processing method.

(ii) Related Art

In the past, systems have been proposed which manage access to a device connected to a server via a network.

Further, so-called cloud computing has been proposed in recent years which is a utilization form of a computer, in which data and the functions of software, hardware, and so forth present in a client computer are transferred to a group of servers on the Internet to allow a user to use only necessary parts of the data and the functions as needed via the Internet. In cloud computing, it is required to easily establish connection between the computer (operation terminal) operated by the user and a device which the user wants to use, while realizing scale-out. Herein, the device is a peripheral apparatus (image processor) of the computer, such as a scanner, a printer, or a multifunction machine.

SUMMARY

According to an aspect of the invention, there is provided an information processing system having a terminal apparatus, an information processor, and an image processor connected to one another. The information processor includes a first virtual machine, a second virtual machine, a first receiving unit, a first forwarding unit, a second receiving unit, and a second forwarding unit. The first receiving unit receives a connection request from the image processor connected to the information processor via a network. The first forwarding unit forwards the connection request received by the first receiving unit to the first virtual machine of the information processor. The second receiving unit receives a connection request from the terminal apparatus connected to the information processor via the network. The second forwarding unit forwards the connection request received by the second receiving unit to the second virtual machine of the information processor. The first virtual machine includes an acquiring unit, a job transfer requesting unit, and a connecting unit. Upon receipt from the image processor of job identifying information generated in the information processing system in accordance with a job set by a user and input to the image processor, the acquiring unit acquires second virtual machine identifying information for identifying the second virtual machine on the basis of the job identifying information. The job transfer requesting unit requests the second virtual machine, in which the job set by the user is registered, to transfer the job to the first virtual machine on the basis of the acquired second virtual machine identifying information. The connecting unit connects the first virtual machine and the image processor upon receipt of the job from the second virtual machine.

BRIEF DESCRIPTION OF THE DRAWINGS

An exemplary embodiment of the present invention will be described in detail based on the following figures, wherein:

FIG. 5 is an operation flowchart of the device connection managing system according to the first example; and FIG. 6 is an operation flowchart of the device connection managing system according to the second example.

DETAILED DESCRIPTION

An exemplary embodiment of the present invention will be described below with reference to the drawings.

Figure 1:
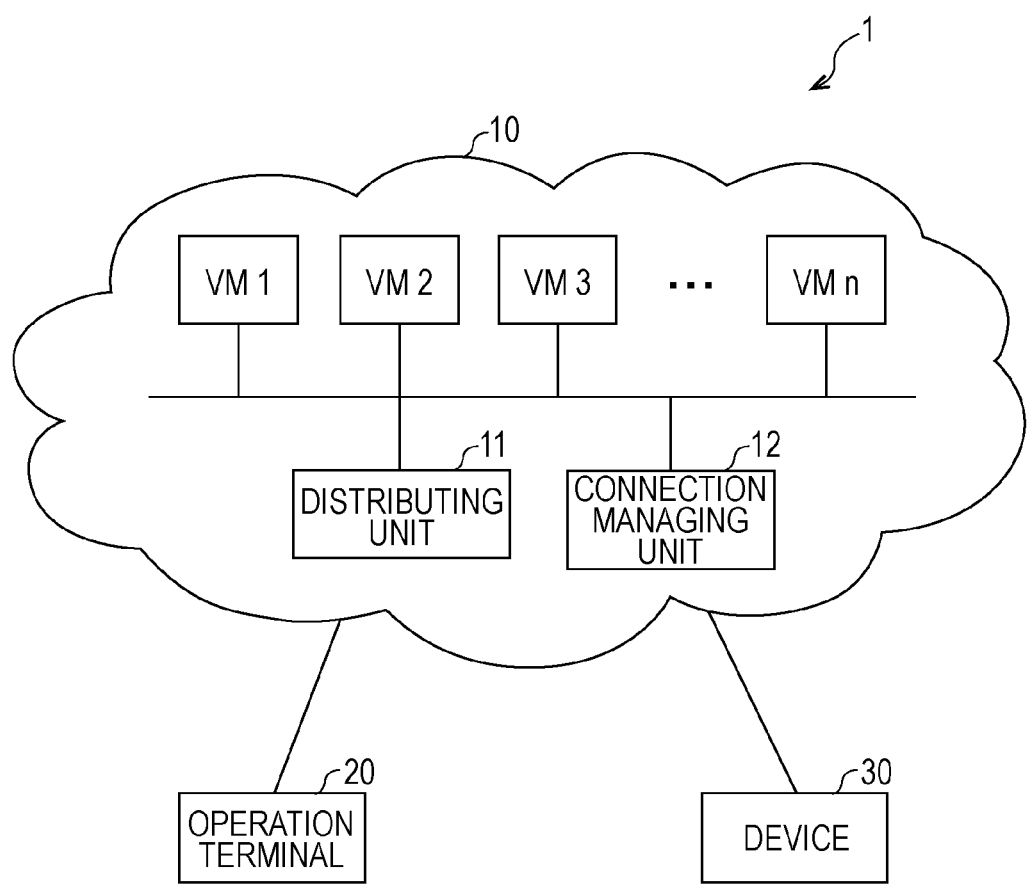
FIG. 1 is a functional block diagram of a device connection managing system according to the present exemplary embodiment.

FIG. 1 is a functional block diagram of a device connection managing system 1 according to the present exemplary embodiment. As illustrated in the drawing, the device connection managing system 1 (information processing system) includes a device managing unit 10 (information processor), an operation terminal 20 (terminal apparatus), and a device 30 (image processor). The operation terminal 20 and the device 30 are each connected to the device managing unit 10 via a network such as the Internet. That is, the device connection managing system 1 is a system that manages the connection between the operation terminal 20 and the device 30 in cloud computing realized by including the operation terminal 20, the device 30, and the device managing unit 10 connected to the operation terminal 20 and the device 30 via the network. In the device connection managing system 1 in FIG. 1, the single operation terminal 20 and the single device 30 are illustrated. However, the invention is not limited thereto. Thus, there may be plural operation terminals 20 and plural devices 30.

The operation terminal 20 is an apparatus operated or instructed by a user, such as a personal computer (PC), a personal digital assistant (PDA), or a smartphone, for example.

The device 30 is a peripheral apparatus commonly connected to a PC or the like by wire or wirelessly, and serves as an image processor such as a scanner, a printer, or a multifunction machine, for example. The device 30 has a communication function, and is connected to the device managing unit 10 via the network. The device 30 may be network-connected to the device managing unit 10 via a repeater or another operation terminal having a communication function.

The device managing unit 10 is a group of servers constructed in a cloud, and includes a distributing unit 11, a connection managing unit 12, and plural virtual machines (VMs).

The VMs are virtual machines constructed in a cloud environment, and serve as logical (virtual) computers divided from a physical computer by a virtualization technology and operating with respective independent operating systems. FIG. 1 illustrates the n number of VMs.

The distributing unit 11 unitarily manages connection requests received from the operation terminal 20 and the device 30 via the network, and forwards each of the connection requests to an arbitrary VM. That is, the distributing unit 11 is a load balancer that distributes and allocates processes to the plural VMs such that the VMs have equal loads. For example, the distributing unit 11 forwards a connection request to a VM having reserve capacity among the plural VMs constructed in the cloud. The distributing unit 11 has the functions of a receiving unit that receives the above-described connection request and a forwarding unit that forwards the connection request.

The connection managing unit 12 registers and manages job information (job identifier (ID)) received from the operation terminal 20 via the network, information of a VM network-connected to the operation terminal 20, information of a VM network-connected to the device 30, and so forth. The connection managing unit 12 includes a memory that stores the above-described types of information. The memory may be provided outside the connection managing unit 12 (to the distributing unit 11, for example).

The above-described device connection managing system 1 is schematically configured to forward respective connection requests from the operation terminal 20 and the device 30 to different arbitrary VMs (temporarily connect the operation terminal 20 and the device 30 to different arbitrary VMs), and transfer a connection authority and/or a job of one of the VMs to the other VM on the basis of a request to use the device 30 received from the operation terminal 20, to thereby establish connection between the operation terminal 20 and the device 30 and execute the job.

Figure 2:
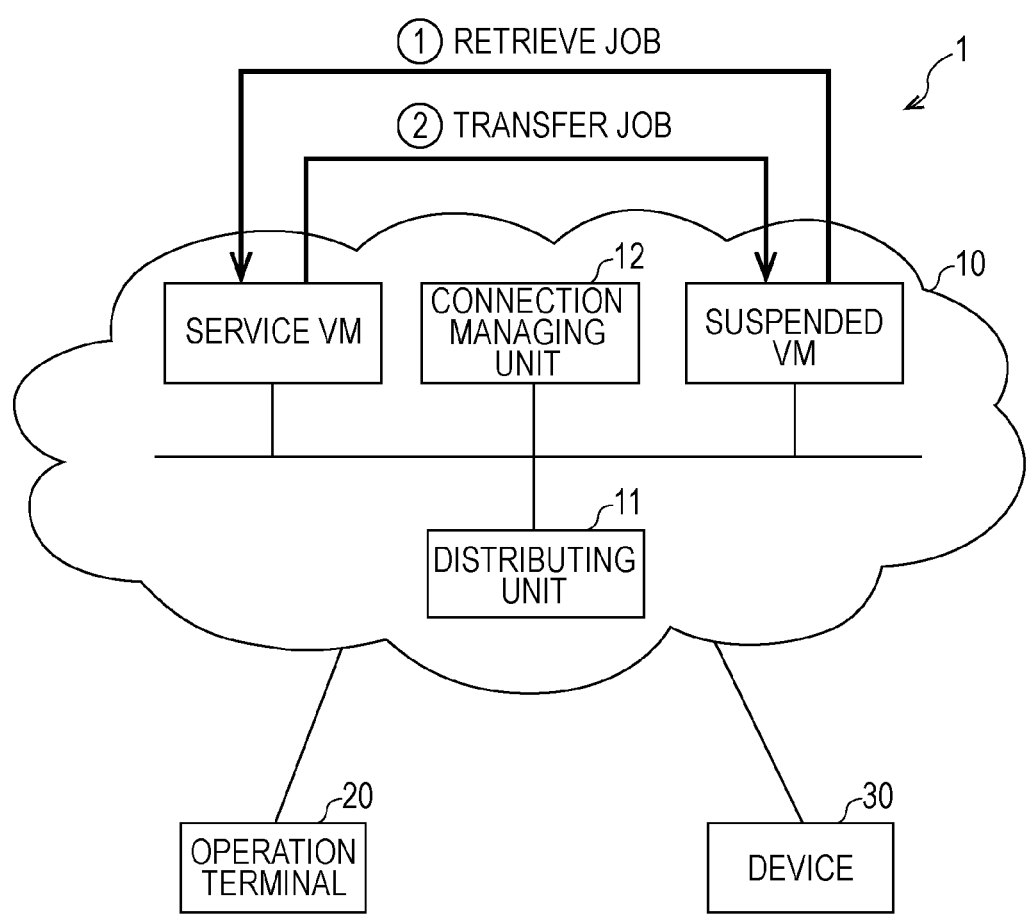
FIG. 2 is a schematic view illustrating a configuration of the device connection managing system according to a first example.
Figure 3:
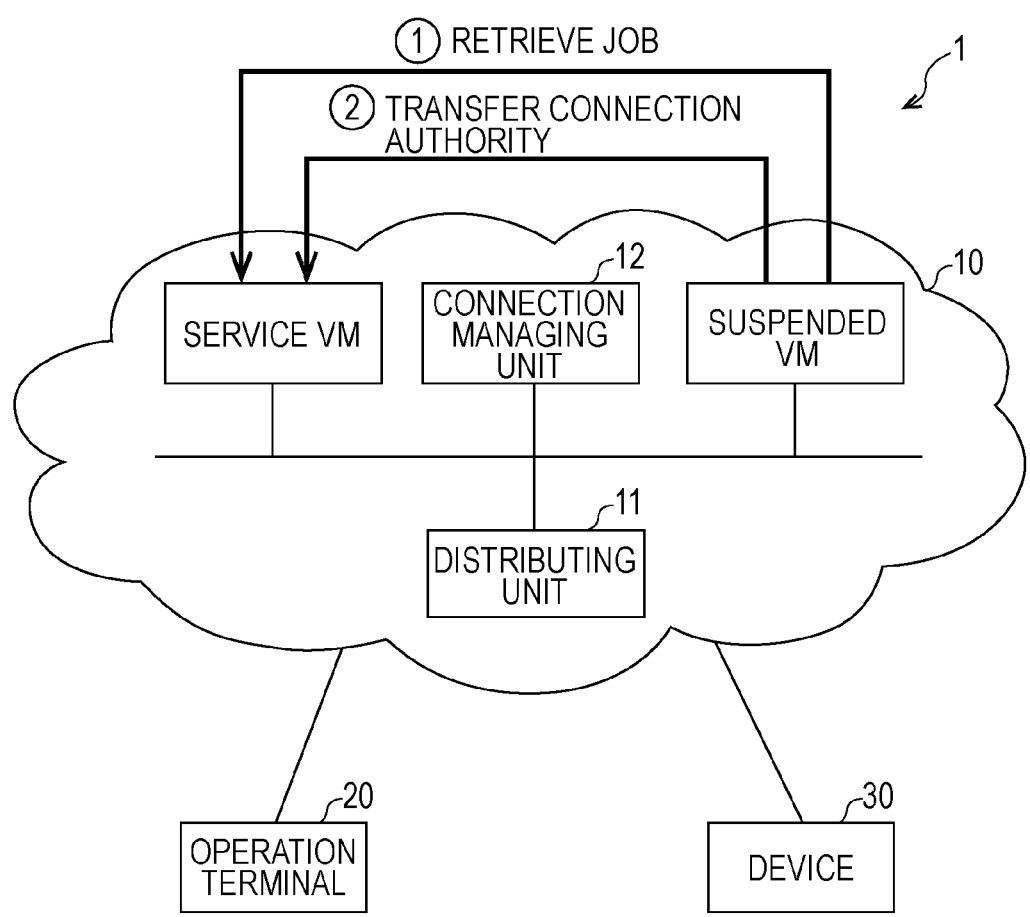
FIG. 3 is a schematic view illustrating a configuration of the device connection managing system according to a second example.

Herein, two methods (examples) are conceivable to realize the above-described configuration. FIG. 2 is a schematic view illustrating a configuration of the device connection managing system 1 according to a first example. According to the configuration of the first example, the VM connected to the device 30 (hereinafter referred to as the suspended VM) retrieves the VM connected to the operation terminal 20 (hereinafter referred to as the service VM), and the service VM transfers the job to the suspended VM to allow the suspended VM to execute the job. FIG. 3 is a schematic view illustrating a configuration of the device connection managing system 1 according to a second example. According to the configuration of the second example, the suspended VM connected to the device 30 retrieves the service VM connected to the operation terminal 20 and transfers the connection authority to connect to the device 30 to the service VM to allow the service VM to execute the job.

In the following, the processing of the device connection managing system 1 according to the above-described first and second examples will be described with reference to specific examples. Herein, a scanner will be described as an example of the device 30.

First Example

Figure 4:
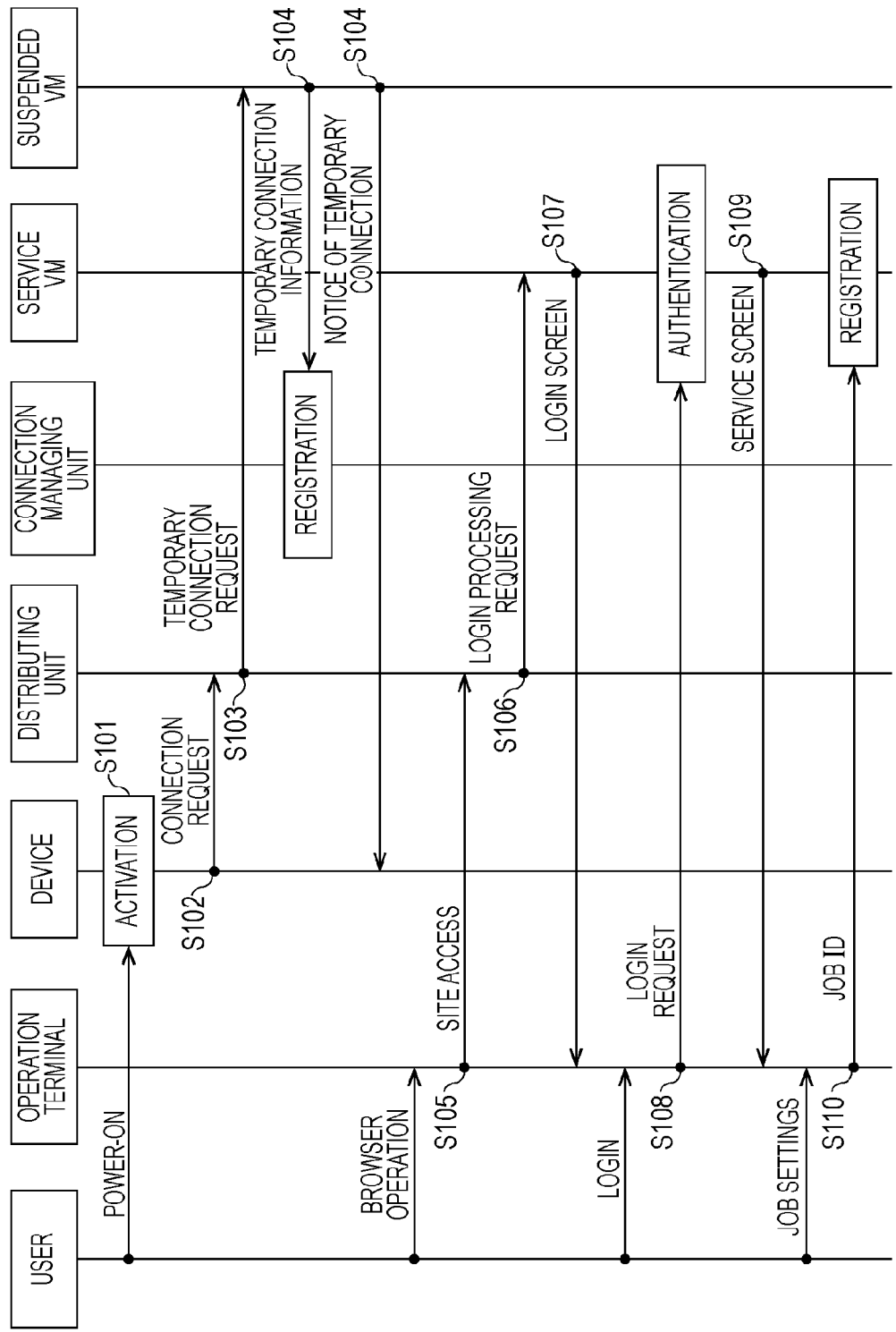
FIG. 4 is an operation flowchart of the device connection managing system according to the first example.

FIGS. 4 and 5 are operation flowcharts of the device connection managing system 1 according to the first example.

A user first powers on the device 30 (scanner). Thereby, the device 30 is activated (step S101). After the activation, the device 30 transmits a connection request to the distributing unit 11 (step S102). The connection request includes information for identifying the device 30 (device identifying information).

Upon receipt of the connection request from the device 30, the distributing unit 11 forwards the connection request (temporary connection request) to an arbitrary VM (the suspended VM, i.e., a first virtual machine) (step S103). The distributing unit 11 forwards the temporary connection request to a VM having a small load, such as a VM not registered with a job yet, for example.

Upon receipt of the temporary connection request from the distributing unit 11, the suspended VM establishes temporary connection with the device 30. After the establishment of the temporary connection, the suspended VM transmits temporary connection information to the connection managing unit 12, and transmits a notice of temporary connection completion to the device 30 (step S104). The temporary connection information includes the device identifying information and information for identifying the suspended VM (suspended VM identifying information) related to each other. It is therefore possible to identify the device 30 and the suspended VM temporarily connected to the device 30 from the temporary connection information.

Upon receipt of the temporary connection information from the suspended VM, the connection managing unit 12 registers the temporary connection information in the memory provided therein.

Thereafter, the user accesses a World Wide Web (Web) site with a Web browser by operating the operation terminal 20 (step S105). Herein, the Web site is a site relating to a scanner service in the cloud computing, for example.

Upon access to the Web site, the distributing unit 11 transmits a login processing request (connection request) to an arbitrary VM (the service VM, i.e., a second virtual machine) (step S106). The distributing unit 11 transmits the login processing request to a VM different from the suspended VM and having a small load, for example, similarly as described above. The login processing request includes information for identifying the operation terminal 20 of the user (terminal identifying information).

Upon receipt of the login processing request from the distributing unit 11, the service VM transmits a login screen to the corresponding operation terminal 20 (step S107).

After the operation terminal 20 receives the login screen from the service VM, the user inputs user information (a user ID and a password, for example) on the login screen displayed on a display of the operation terminal 20. Upon completion of the input, the operation terminal 20 transmits a login request including the user information to the service VM (step S108).

Upon receipt of the login request from the operation terminal 20, the service VM performs user authentication on the basis of the user information in the login request. If the user is authenticated, the service VM transmits a service screen to the operation terminal 20 (step S109). Thereby, the operation terminal 20 and the service VM are connected.

After the operation terminal 20 receives the service screen from the service VM, the user sets a job on the service screen displayed on the display of the operation terminal 20. Specifically, the user selects the device 30 (scanner in this case), and reserves the execution of the job. After the user reserves the execution of the job, information for identifying the job (job ID) is generated in the device connection managing system 1 (step S110). The job (job ID) set by the user is related to the information for identifying the device 30 that is to be used (device identifying information).

The service VM registers the job ID in a memory provided therein, and transmits job information to the connection managing unit 12 (step S111). The job information includes the job ID and information for identifying the service VM (service VM identifying information) related to each other. Upon receipt of the job information from the service VM, the connection managing unit 12 registers the job information in the memory. The memory of the connection managing unit 12 may store plural items of the job information. In this case, the respective items of the job information are related to corresponding job IDs, which are different from one another, and items of the service VM identifying information corresponding to the respective job IDs. Further, the service VM transmits the job ID to the operation terminal 20, and thereafter stands by for an instruction from the device 30 (step S112).

Thereafter, the user inputs the job ID to the device 30 which the user is going to use, and the device 30 performs authentication (reception) of the job ID (step S113). If the input job ID is authenticated, the device 30 transmits the job ID to the suspended VM (step S114). The device 30 may transmit the job ID to the suspended VM without performing the authentication of the input job ID.

Upon receipt of the job ID from the device 30, the suspended VM requests the connection managing unit 12 to transmit thereto the job information, i.e., the service VM identifying information related to the job ID (step S115).

Upon receipt of the request for the job information from the suspended VM, the connection managing unit 12 acquires the service VM identifying information related to the job ID by referring to the memory, and transmits the service VM identifying information to the suspended VM (step S116).

Upon receipt of the service VM identifying information from the connection managing unit 12, the suspended VM requests the service VM identified from the service VM identifying information to transfer the job to the suspended VM (transmits a job transfer request to the service VM) (step S117).

Upon receipt of the job transfer request from the suspended VM, the service VM transfers the job of the job ID received from the operation terminal 20 to the suspended VM (step S118). Further, the service VM transfers the authority of the connection (step S109 in FIG. 4) established by the login of the operation terminal 20 to the suspended VM (step S119).

With the transfer of the job of the job ID and the connection authority to connect to the operation terminal 20, the suspended VM and the operation terminal 20 are connected, and the suspended VM and the device 30 are regularly connected.

After the suspended VM and the device 30 are regularly connected, negotiation takes place therebetween to exchange information such as conditions for communication between the suspended VM and the device 30 (step S120).

Further, upon completion of the above-described regular connection, the suspended VM transmits regular connection information to the connection managing unit 12, and the connection managing unit 12 registers the regular connection information in the memory (step S121). The regular connection information includes the job ID, the suspended VM identifying information, and the device identifying information related to one another.

After the negotiation between the suspended VM and the device 30, the device 30 becomes available. Then, the user performs a scanning operation (step S122). The device 30 inputs data for executing the reserved job (scanned data) to the suspended VM, and the suspended VM executes the job (step S123).

After the execution of the job, the suspended VM transmits a connection cancellation request to the connection managing unit 12 (step S124). The connection cancellation request includes the information of the job ID, the device identifying information, and the suspended VM identifying information related to one another. Upon receipt of the connection cancellation request from the suspended VM, the connection managing unit 12 cancels the regular connection between the suspended VM and the device 30.

With the above-described sequence of processes, the connection between the suspended VM and the device 30 is established, and the job corresponding to the job ID is executed. Accordingly, it is possible to easily establish connection between an operation terminal and a device, while realizing scale-out.

As described above, the suspended VM includes an acquiring unit, a job transfer requesting unit, and a connecting unit. Upon receipt from the device 30 of job identifying information generated in the device connection managing system 1 in accordance with the job set by the user and input to the device 30, the acquiring unit acquires, on the basis of the job identifying information, the service VM identifying information from the memory that stores the job identifying information and the service VM identifying information related to each other. The job transfer requesting unit requests the service VM, in which the job set by the user is registered, to transfer the job to the suspended VM on the basis of the acquired service VM identifying information. The connecting unit connects the suspended VM and the device 30 upon receipt of the job from the service VM. The suspended VM further includes an executing unit that executes the job on the device 30. That is, the suspended VM has the functions of the above-described units.

Further, the service VM includes a job transferring unit that transfers the job to the suspended VM upon receipt of the job transfer request from the suspended VM. That is, the service VM has the function of the job transferring unit.

Further, the device 30 includes an authenticating unit that authenticates the job ID presented by the user, and the device 30 transmits the authenticated job ID to the suspended VM. That is, the device 30 has the function of the authenticating unit.

Herein, the processing example illustrated in FIGS. 4 and 5 illustrates the case in which a single user inputs a job. However, the first example is not limited thereto, and is also applicable to a case in which plural users select the same device and input mutually different jobs to the device. That is, if the suspended VM temporarily connected to the device 30 acquires the information of the service VM related to a job ID authenticated by the device 30 among plural job IDs stored in the connection managing unit 12, and if the service VM transfers the corresponding job to the suspended VM, the suspended VM is capable of establishing connection with the device 30 and execute the job. It is therefore possible that plural users appropriately share the same device 30.

According to the above-described processing, a job is transferred to and executed by a VM without switching of connection of a device between VMs. Accordingly, a load required for the above-described switching of connection is reduced. The present example is particularly effective in a case in which there are a relatively small number of jobs.

Second Example

The processing of the device connection managing system 1 according to the second example will be described. The processing of the device connection managing system 1 according to the second example is the same as that of the first example in steps S101 to S116 of FIGS. 4 and 5 described in the first example. FIG. 6 illustrates a flow of operations performed after the above-described step S116 in the device connection managing system 1 according to the second example. The description herein will focus on differences from the first example.

Upon acquisition of the service VM identifying information from the connection managing unit 12 at step S116, the suspended VM transfers the connection authority to connect to the device 30 to the service VM identified from the service VM identifying information (step S131). Thereby, the service VM and the device 30 are regularly connected.

After the service VM and the device 30 are regularly connected, negotiation takes place therebetween to exchange information such as conditions for communication between the service VM and the device 30 (step S132).

Further, upon completion of the above-described regular connection, the service VM transmits regular connection information to the connection managing unit 12, and the connection managing unit 12 registers the regular connection information in the memory (step S133). The regular connection information includes the job ID, the service VM identifying information, and the device identifying information related to one another.

After the negotiation between the service VM and the device 30, the device 30 becomes available. Then, the user performs a scanning operation (step S134). The device 30 inputs data for executing the reserved job (scanned data) to the service VM, and the service VM executes the job (step S135).

After the execution of the job, the service VM transmits a connection cancellation request to the connection managing unit 12 (step S136). The connection cancellation request includes the information of the job ID, the device identifying information, and the service VM identifying information related to one another. Upon receipt of the connection cancellation request from the service VM, the connection managing unit 12 cancels the regular connection between the device 30 and the service VM.

According to the above-described processing, it is possible to easily establish connection between an operation terminal and a device while realizing scale-out.

As described above, the suspended VM includes an acquiring unit and a connection transferring unit. Upon receipt from the device 30 of the job identifying information generated in the device connection managing system 1 in accordance with the job set by the user and input to the device 30, the acquiring unit acquires, on the basis of the job identifying information, the service VM identifying information from the memory that stores the job identifying information and the service VM identifying information related to each other. The connection transferring unit transfers the connection authority to connect to the device 30 to the service VM, in which the job set by the user is registered, on the basis of the acquired service VM identifying information. That is, the suspended VM has the functions of the above-described units.

Further, the service VM includes a connecting unit that connects the service VM and the device 30 upon receipt of the connection authority from the suspended VM. The service VM further includes an executing unit that executes the job on the device 30. That is, the service VM functions as the above-described units.

The second example is also applicable to the case in which plural users select the same device and input mutually different jobs to the device. That is, if the suspended VM temporarily connected to the device 30 acquires the information of the service VM related to a job ID authenticated by the device 30 among plural job IDs stored in the connection managing unit 12, and if the suspended VM transfers the connection authority to connect to the device 30 to the service VM, it is possible to establish connection between the service VM and the device 30, and allow the service VM to execute the job. It is therefore possible that plural users appropriately share the same device 30.

The functions of the above-described units included in the above-described device managing unit 10 (information processor) may be realized when a program stored in a computer readable information storage medium is read and executed by a computer including, for example, a controller such as a central processing unit (CPU), a storage unit such as a memory, and an input-output unit that transmits and receives data to and from an external device. The program may be supplied to the device managing unit 10 serving as a computer by an information storage medium, such as an optical disc, a magnetic disc, a magnetic tape, a magneto-optical disc, or a flash memory. Alternatively, the program may be supplied to the device managing unit 10 via a data communication network, such as the Internet.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing system having a terminal apparatus, an information processor, and an image processor connected to one another, wherein the information processor comprises:

a first virtual machine;

a second virtual machine;

a first receiving unit that receives a connection request from the image processor connected to the information processor via a network;

a first forwarding unit that forwards the connection request received by the first receiving unit to the first virtual machine of the information processor;

a second receiving unit that receives a connection request from the terminal apparatus connected to the information processor via the network; and a second forwarding unit that forwards the connection request received by the second receiving unit to the second virtual machine of the information processor, and wherein the first virtual machine comprises:

an acquiring unit that, upon receipt from the image processor of job identifying information generated in the information processing system in accordance with a job set by a user, the job being input to the image processor, acquires second virtual machine identifying information for identifying the second virtual machine on the basis of the job identifying information;

a job transfer requesting unit that requests the second virtual machine, in which the job set by the user is registered, to transfer the job to the first virtual machine on the basis of the acquired second virtual machine identifying information; and a connecting unit that connects the first virtual machine and the image processor upon receipt of the job from the second virtual machine.

2. The information processing system according to claim 1, wherein the second virtual machine comprises a job transferring unit that transfers the job to the first virtual machine upon receipt of the request to transfer the job from the first virtual machine.

3. The information processing system according to claim 2, wherein the first virtual machine further comprises an executing unit that executes the job on the image processor.

4. The information processing system according to claim 1, wherein the first virtual machine further comprises an executing unit that executes the job on the image processor.

5. The information processing system according to claim 1, wherein the user presents the job identifying information to the image processor, and the image processor transmits the presented job identifying information to the first virtual machine.

6. The information processing system according to claim 1, wherein the information processor further comprises a memory that stores a plurality of items of the job identifying information and a plurality of items of the second virtual machine identifying information, with each of the items of the job identifying information related to the corresponding item of the second virtual machine identifying information, and
wherein the acquiring unit acquires an item of the second virtual machine identifying information related to, among the plurality of items of the job identifying information stored in the memory, an item of the job identifying information received from the image processor.

7. An information processing system having a terminal apparatus, an information processor, and an image processor connected to one another, wherein the information processor comprises:
a first virtual machine;
a second virtual machine;
a first receiving unit that receives a connection request from the image processor connected to the information processor via a network;
a first forwarding unit that forwards the connection request received by the first receiving unit to the first virtual machine of the information processor;
a second receiving unit that receives a connection request from the terminal apparatus connected to the information processor via the network; and
a second forwarding unit that forwards the connection request received by the second receiving unit to the second virtual machine of the information processor,
wherein the first virtual machine comprises:
an acquiring unit that, upon receipt from the image processor of job identifying information generated in the information processing system in accordance with a job set by a user, the job being input to the image processor, acquires second virtual machine identifying information for identifying the second virtual machine on the basis of the job identifying information; and
a connection transferring unit that transfers a connection authority to connect to the image processor to the second virtual machine, in which the job set by the user is registered, on the basis of the acquired second virtual machine identifying information, and
wherein the second virtual machine comprises a connecting unit that connects the second virtual machine and the image processor upon receipt of the connection authority from the first virtual machine.

8. The information processing system according to claim 7, wherein the second virtual machine further comprises an executing unit that executes the job on the image processor.

9. The information processing system according to claim 7, wherein the user presents the job identifying information to the image processor, and the image processor transmits the presented job identifying information to the first virtual machine.

10. The information processing system according to claim 7, wherein the information processor further comprises a memory that stores a plurality of items of the job identifying information and a plurality of items of the second virtual machine identifying information, with each of the items of the job identifying information related to the corresponding item of the second virtual machine identifying information, and
wherein the acquiring unit acquires an item of the second virtual machine identifying information related to, among the plurality of items of the job identifying information stored in the memory, an item of the job identifying information received from the image processor.

11. An information processor comprising:
a first virtual machine;
a second virtual machine;
a first receiving unit that receives a connection request from an image processor connected to the information processor via a network;
a first forwarding unit that forwards the connection request received by the first receiving unit to the first virtual machine of the information processor;
a second receiving unit that receives a connection request from a terminal apparatus connected to the information processor via the network; and
a second forwarding unit that forwards the connection request received by the second receiving unit to the second virtual machine of the information processor,
wherein the first virtual machine comprises:
an acquiring unit that, upon receipt from the image processor of job identifying information generated in the information processor in accordance with a job set by a user, the job being input to the image processor, acquires second virtual machine identifying information for identifying the second virtual machine on the basis of the job identifying information;
a job transfer requesting unit that requests the second virtual machine, in which the job set by the user is registered, to transfer the job to the first virtual machine on the basis of the acquired second virtual machine identifying information; and
a connecting unit that connects the first virtual machine and the image processor upon receipt of the job from the second virtual machine.

12. A non-transitory computer readable medium storing a program causing a computer, which serves as an information processor including a first virtual machine and a second virtual machine, to execute a process for information processing, the process comprising:
receiving a connection request from an image processor connected to the information processor via a network;
forwarding the received connection request to the first virtual machine of the information processor;
receiving another connection request from a terminal apparatus connected to the information processor via the network;
forwarding the received another connection request to the second virtual machine of the information processor; and
causing the first virtual machine to
upon receipt from the image processor of job identifying information generated in the information processor in accordance with a set job, the job being input to the image processor, acquire second virtual machine identifying information for identifying the second virtual machine on the basis of the job identifying information, request the second virtual machine, in which the set job is registered, to transfer the job to the first virtual machine on the basis of the acquired second virtual machine identifying information, and connect the first virtual machine and the image processor upon receipt of the job from the second virtual machine.

13. An information processing method for an information processing system having a terminal apparatus, an information processor, and an image processor connected to one another, the information processing method comprising:

causing the information processor to receive a connection request from the image processor connected to the information processor via a network, forward the received connection request to the first virtual machine of the information processor, receive another connection request from the terminal apparatus connected to the information processor via the network, and forward the received another connection request to the second virtual machine of the information processor; and causing the first virtual machine to upon receipt from the image processor of job identifying information generated in the information processing system in accordance with a set job, the job being input to the image processor, acquire second virtual machine identifying information for identifying the second virtual machine on the basis of the job identifying information, request the second virtual machine, in which the set job is registered, to transfer the job to the first virtual machine on the basis of the acquired second virtual machine identifying information, and connect the first virtual machine and the image processor upon receipt of the job from the second virtual machine.

* * * * *